(12) United States Patent
Panchal et al.

(10) Patent No.: US 11,009,229 B2
(45) Date of Patent: May 18, 2021

(54) METHOD FOR FLUIDIZING SPENT CATALYST

(71) Applicant: UOP LLC, Des Plaines, IL (US)

(72) Inventors: Dharmesh Chunilal Panchal, Surbiton (GB); Mohammad Reza Mostofi-Ashtiani, Naperville, IL (US); Jagjit Singh Lall, Guildford (GB); Paolo Palmas, Des Plaines, IL (US); Michael S. Sandacz, Glen Ellyn, IL (US); Sathit Kulprathipanja, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 324 days.

(21) Appl. No.: 16/038,988

(22) Filed: Jul. 18, 2018

(65) Prior Publication Data
US 2018/0320891 A1  Nov. 8, 2018

Related U.S. Application Data

(63) Continuation of application No. PCT/US2017/016902, filed on Feb. 8, 2017.

(60) Provisional application No. 62/301,427, filed on Feb. 29, 2016.

(51) Int. Cl.
| F23C 10/20 | (2006.01) |
| B01J 8/18 | (2006.01) |
| B01J 8/28 | (2006.01) |
| B01J 38/30 | (2006.01) |
| C10G 11/18 | (2006.01) |
| F23C 10/01 | (2006.01) |
| B01J 29/90 | (2006.01) |

(52) U.S. Cl.
CPC ............. *F23C 10/20* (2013.01); *B01J 8/1818* (2013.01); *B01J 8/28* (2013.01); *B01J 38/30* (2013.01); *C10G 11/182* (2013.01); *F23C 10/01* (2013.01); *B01J 29/90* (2013.01)

(58) Field of Classification Search
CPC ......... F23C 10/20; F23C 10/01; B01J 8/1818; B01J 8/828; B01J 38/30; B01J 29/90; C10G 11/182
USPC .......................................................... 502/41
See application file for complete search history.

(56) References Cited

U.S. PATENT DOCUMENTS

| 4,035,153 A | 7/1977 | Bunn et al. |
| 4,223,843 A | 9/1980 | Smith et al. |
| 4,595,145 A | 6/1986 | Pratt et al. |
| 4,610,851 A | 9/1986 | Colvert et al. |
| 4,859,430 A | 8/1989 | Julian et al. |
| 4,968,404 A | 11/1990 | Chan et al. |
| 5,077,252 A | 12/1991 | Owen et al. |
| 5,773,378 A | 6/1998 | Bussey et al. |
| 5,827,793 A | 10/1998 | Hu |
| 6,797,239 B1 | 9/2004 | Chen et al. |
| 7,026,262 B1 | 4/2006 | Palmas et al. |
| 8,535,610 B2 | 9/2013 | Palmas et al. |
| 2005/0019228 A1 | 1/2005 | Myers et al. |
| 2010/0150788 A1 | 6/2010 | Palmas et al. |
| 2010/0152020 A1 | 6/2010 | Palmas et al. |
| 2011/0313062 A1 | 12/2011 | Ruppel et al. |

FOREIGN PATENT DOCUMENTS

| CN | 203944364 U | 11/2014 |
| EP | 0181108 A2 | 5/1986 |
| EP | 289991 A2 | 11/1988 |
| EP | 1408100 A1 | 4/2004 |
| EP | 1963463 A1 | 9/2008 |

OTHER PUBLICATIONS

Extended European Search Report dated Aug. 9, 2019 for corresponding EP Application No. 17760454.3.
PCT Search Report dated May 4, 2017 for corresponding PCT Application No. PCT/US2017/016902.

*Primary Examiner* — Edward J Johnson
(74) *Attorney, Agent, or Firm* — Paschall & Associates, LLC; James C. Paschall

(57) ABSTRACT

A method for fluidizing a spent catalyst in a regenerator during a combustion process. The combustor includes a vessel and an air distributor. The air distributor includes an air grid and a plurality of first nozzles extending from the air grid. Spent catalyst is introduced into the vessel. Air is provided to the vessel via the plurality of first nozzles at a base combustion air rate. Additional air is provided to the vessels via a plurality of second nozzles of a fluffing air distributor at a fluffing air rate that is between 0.5 wt % and 10 wt % of the base combustion air rate to fluidize the catalyst. The second nozzles have outlets that are disposed below the air grid and above a bottom head of the vessel.

17 Claims, 6 Drawing Sheets

METHOD FOR FLUIDIZING SPENT CATALYST

CROSS-REFERENCE TO RELATED APPLICATIONS

This application is a Continuation of copending International Application No. PCT/US2017/016902 filed Feb. 8, 2017, which application claims priority from U.S. Provisional Application No. 62/301,427 filed Feb. 29, 2016, the contents of which cited applications are hereby incorporated by reference in their entirety.

FIELD

This invention relates generally to distribution methods and devices for hydrocarbon processes.

BACKGROUND

Numerous hydrocarbon conversion processes are widely used to alter the structure or properties of hydrocarbon streams. Such processes include isomerization from straight chain paraffinic or olefinic hydrocarbons to more highly branched hydrocarbons, dehydrogenation for producing olefinic or aromatic compounds, reforming to produce aromatics and motor fuels, alkylation to produce commodity chemicals and motor fuels, transalkylation, and others. Many such processes use catalysts to promote hydrocarbon conversion reactions. A particular example of a hydrocarbon conversion process employing a catalyst is a fluidized catalytic cracking (FCC) process.

FCC systems typically include a regeneration zone, many of which maintain a dense fluidized bed of catalyst particles through which an oxygen-containing regeneration gas, such as air, passes to combust coke. The coke forms as a byproduct of the cracking operation.

A common regeneration zone operation introduces the regenerator gas, e.g., air, into the bottom of the regenerator through a bottom closure of a regenerator vessel. An air distributor divides the introduced air and injects it into the catalyst bed at a multiplicity of points to obtain good air distribution. A particular example regeneration zone using an air distributor is a combustor style single stage regenerator (combustor style regenerator). This regenerator is particularly useful to achieve a low carbon level on regenerated catalyst that is uniform through the regenerated catalyst.

An example combustor style regenerator includes a lower combustor, an internal combustor riser, and an upper regenerator embodied in a disengaging vessel having cyclones. The combustor includes a metal vessel, e.g., carbon steel, having a bottom head at a base. The bottom head is insulated with a refractory lining material. To provide air for combustion, an air distributor is provided within the vessel above the bottom head, particularly at or near a lower tangent line of the vessel. A typical air distributor includes a hub that is in fluid communication with a plurality of nozzles disposed along an air grid, such as a pipe grid, mounted within the vessel. The nozzles are directed from the air grid into the vessel.

In an example combustion operation, air enters the combustor via a conduit centrally located in the bottom of the vessel that is in fluid communication with an air grid. The air grid divides the input air from the conduit to the plurality of nozzles, through which the air is injected into the interior of the vessel. Spent catalyst is introduced into the vessel near the base, for example via a spent catalyst standpipe leading to the vessel. At the bottom of the combustor the spent catalyst (e.g., from a reaction zone) mixes with the air and with (hot) recirculating catalyst from the upper regenerator, fluidizing the spent catalyst. The air is used to burn the coke off the fluidized spent catalyst as the fluidized spent catalyst moves up the combustor and the internal combustor riser.

During combustion, the region of the vessel above the bottom head and below the air grid becomes filled with unfluidized catalyst because the nozzle penetration may not be adequate to fluidize this region. This region can have a significant volume. For example, a distance of the vessel below the air grid and connected nozzles could be as much as two meters in larger size vessels. Unfluidized catalyst accumulates near the bottom head, and this accumulated catalyst acts as an insulator in addition to the refractory lining on the bottom head. This leads to very low skin temperatures of the vessel on the bottom head below the sulphuric acid dew point which could lead to corrosion of the vessel.

Therefore, there remains a need for effective and efficient processes for fluidizing spent catalyst.

SUMMARY

The present invention is directed to providing effective and efficient processes for fluidizing a catalyst.

Accordingly, one aspect of the present invention provides a method for fluidizing a spent catalyst in a regenerator during a combustion process. The regenerator includes a vessel and an air distributor. The air distributor includes an air grid and a plurality of first nozzles extending from the air grid. The spent catalyst is introduced into the vessel. Air is provided to the vessel via the plurality of first nozzles at a base combustion air rate. Additional air is provided to the vessels via a plurality of second nozzles of a fluffing air distributor at a fluffing air rate that is between 0.5 wt % and 10 wt % of the base combustion air rate to fluidize the spent catalyst. The plurality of second nozzles have outlets that are disposed below the air grid and above a bottom head of the vessel.

Another aspect of the present invention provides a method for fluidizing a spent catalyst in a regenerator during a combustion process. The regenerator includes a vessel and an air distributor. The air distributor includes an air grid and a plurality of first nozzles extending from the air grid. The spent catalyst is introduced into the vessel. Air is provided to the vessel via the plurality of first nozzles at a base combustion air rate. Additional air is provided to the vessels via a plurality of second nozzles of a fluffing air distributor to fluidize the spent catalyst. The plurality of second nozzles have outlets that are disposed below the air grid and above a bottom head of the vessel. The outlets of the plurality of second nozzles are disposed on at least two levels, each of the two levels being disposed at a different height distance from the air grid.

Another aspect of the present invention provides an apparatus for regenerating a spent catalyst. The apparatus comprises a vessel for receiving the spent catalyst through a catalyst inlet and an air distributor disposed in the vessel, the air distributor comprising an air grid below the catalyst inlet and a plurality of first nozzles extending from the air grid into the vessel; an air source coupled to the air distributor; and a fluffing air distributor disposed in the vessel for fluidizing the spent catalyst. The fluffing air distributor comprises a plurality of second nozzles having outlets disposed below the air grid and above a bottom head of the vessel. The plurality of second nozzles are disposed on at least two levels, each of the two levels being disposed at a different height distance from the air grid.

Additional objects, embodiments, and details of the invention are set forth in the following detailed description of the invention.

DETAILED DESCRIPTION

Figure 1:
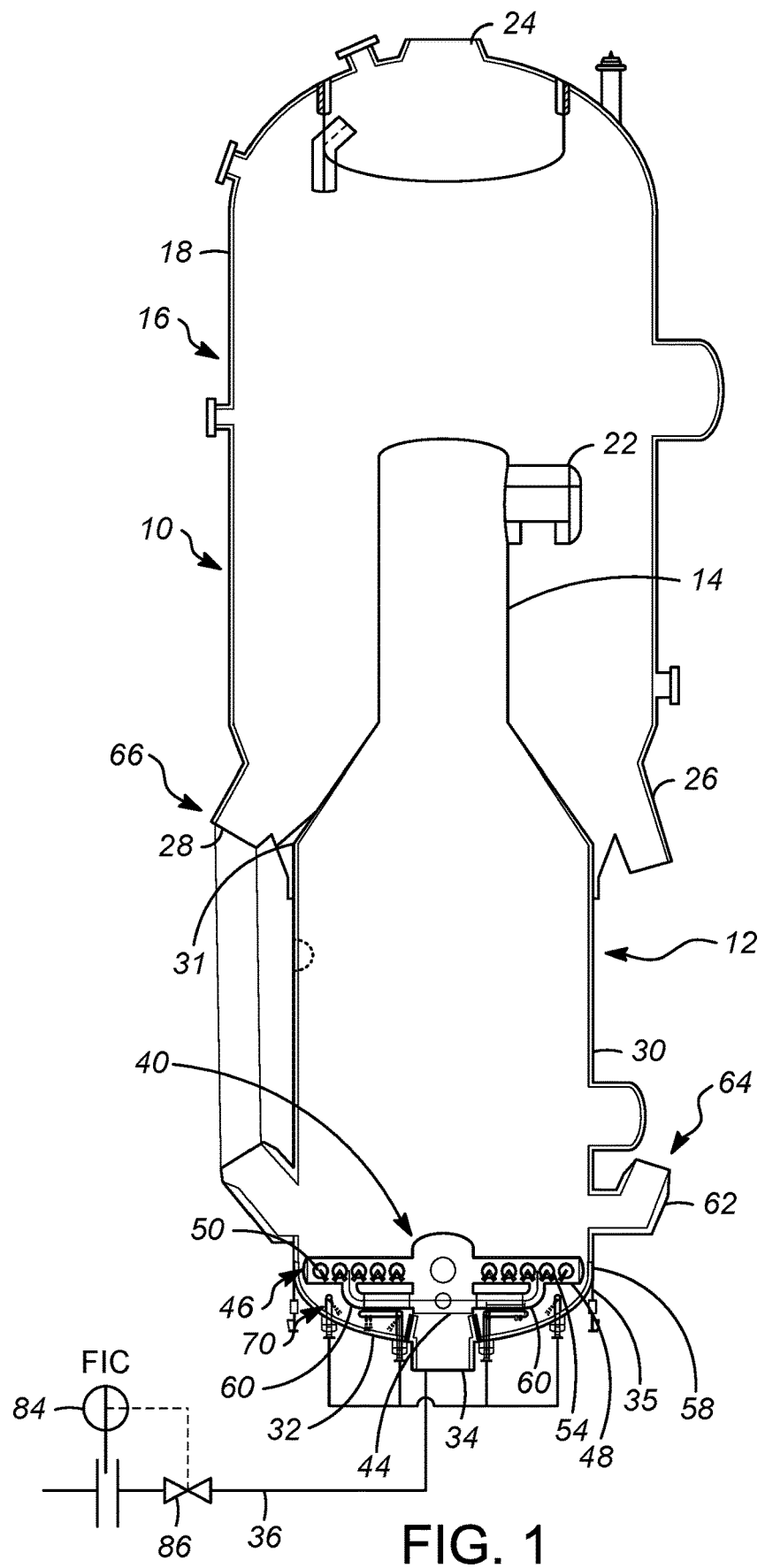
FIG. 1 is a sectional view of a combustor style regenerator for a fluidic catalytic cracking process according to an example embodiment.

FIG. 1 shows an example single stage combustor style regenerator (combustor style regenerator) 10 for use in a catalyst regeneration zone. However, it will be appreciated that examples used herein can be used in various regenerators. The combustor style regenerator 10 generally includes a lower combustor 12, an internal combustor riser 14 in communication with the lower combustor, and an upper regenerator 16 in communication with the internal combustor riser. The upper regenerator 16 may include, for example, a disengaging vessel 18 having cyclones (not shown) disposed therein. The combustor riser 14 terminates in a disengager 22, e.g., a "tee" disengager, for separating combustion gases and catalyst from the combustor riser. A vent 24 is disposed at the top of the combustor style regenerator 10 for venting flue gas. A catalyst recirculation standpipe 28 and a regenerated catalyst standpipe 26 are coupled to the upper regenerator 16 for exiting regenerated catalyst. A catalyst cooler (not shown) can also be coupled to the upper regenerator 16 for cooling regenerated catalyst, though the catalyst cooler may be omitted in some embodiments.

The lower combustor 12 includes a generally cylindrical vessel 30 having inner walls within which spent catalyst is mixed with air to combust coke from the spent catalyst. The vessel 30 includes a combustor cone 31, a bottom head 32, and a centrally disposed conduit 34, e.g., with an outlet in the vessel, for introduction of an oxygen-containing regeneration gas such as air. The vessel 30 is mounted on a vessel support skirt 35 for support. As air is a preferred regeneration gas, description of illustrative methods herein will refer to air. The conduit 34 is coupled to an air supply 36, e.g., a controlled air blower, for passing high pressure air to an air distributor 40 for introduction into the vessel 30. The air distributor 40 is preferably a pipe distributor, and includes a hub 44 in fluid communication with the conduit 34, and an air grid 46 having a generally symmetrically arranged plurality of header arms 48 (best viewed in FIG. 2), each having a plurality of generally symmetrically arranged pipes 50 coupled thereto. The header arms 48 and the pipes 50 are in fluid communication with the hub 44 for distributing air from the hub. The header arms 48 and pipes 50 each have bores 52 (see FIG. 3) formed on lower and/or upper surfaces. In another example, only the pipes 50 include the bores 52. Jets, such as nozzles 54, protrude from the bores 52. In the lower combustor 12, each of the nozzles 54 protrude from the direction of flow through the pipes 50. It is not required that the nozzles 54 all protrude at the same angle.

Preferably, the air grid 46 is disposed at or near a lower tangent line 58 of the vessel 30. Elbows 60 are disposed between the hub 44 and the air grid 46 for support. The header arms 48 and pipes 50, the elbows 60, and/or the hub 44 can be lined, for example with abrasion resistant lining. An interior of the bottom head 32 may also be lined with refractory lining. Example refractor lining includes, but is not limited to, Light-weight Insulation Refractory, Mid-weight Refractory Lining, or High Density Refractory Lining.

As shown in FIG. 1, spent catalyst standpipes 62 are coupled to the vessel 30, preferably disposed near and above the lower tangent line, for introducing spent catalyst, e.g., from a reaction zone, and providing a catalyst inlet 64. Another catalyst inlet 66 is provided by the catalyst recirculation standpipe 28. The introduced spent catalyst is fluidized by air distributed by the air grid and exiting through the nozzles 54.

To fluidize spent catalyst in a region below the air grid 46, a fluffing air distributor 70 is provided below the air grid (i.e., below the header arms 48 and pipes 50), disposed between the air grid and the bottom head 32. Providing additional fluffing air enhances catalyst movement and heat transfer.

Figure 2:
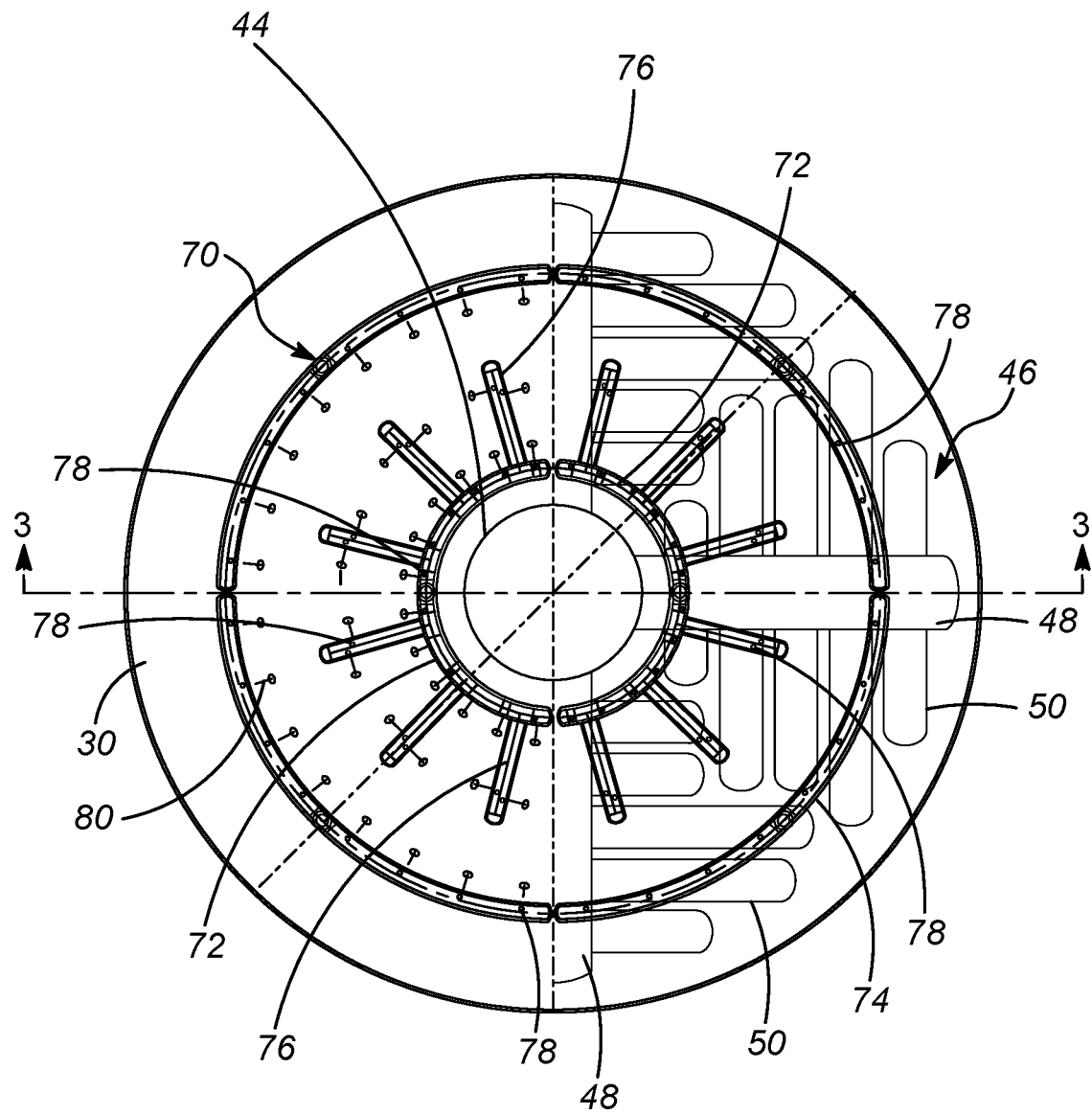
FIG. 2 is a bottom sectional view of a lower portion of a combustor for the combustor style regenerator of FIG. 1, in which a portion of an air distributor and a fluffing air distributor are shown.
Figure 3:
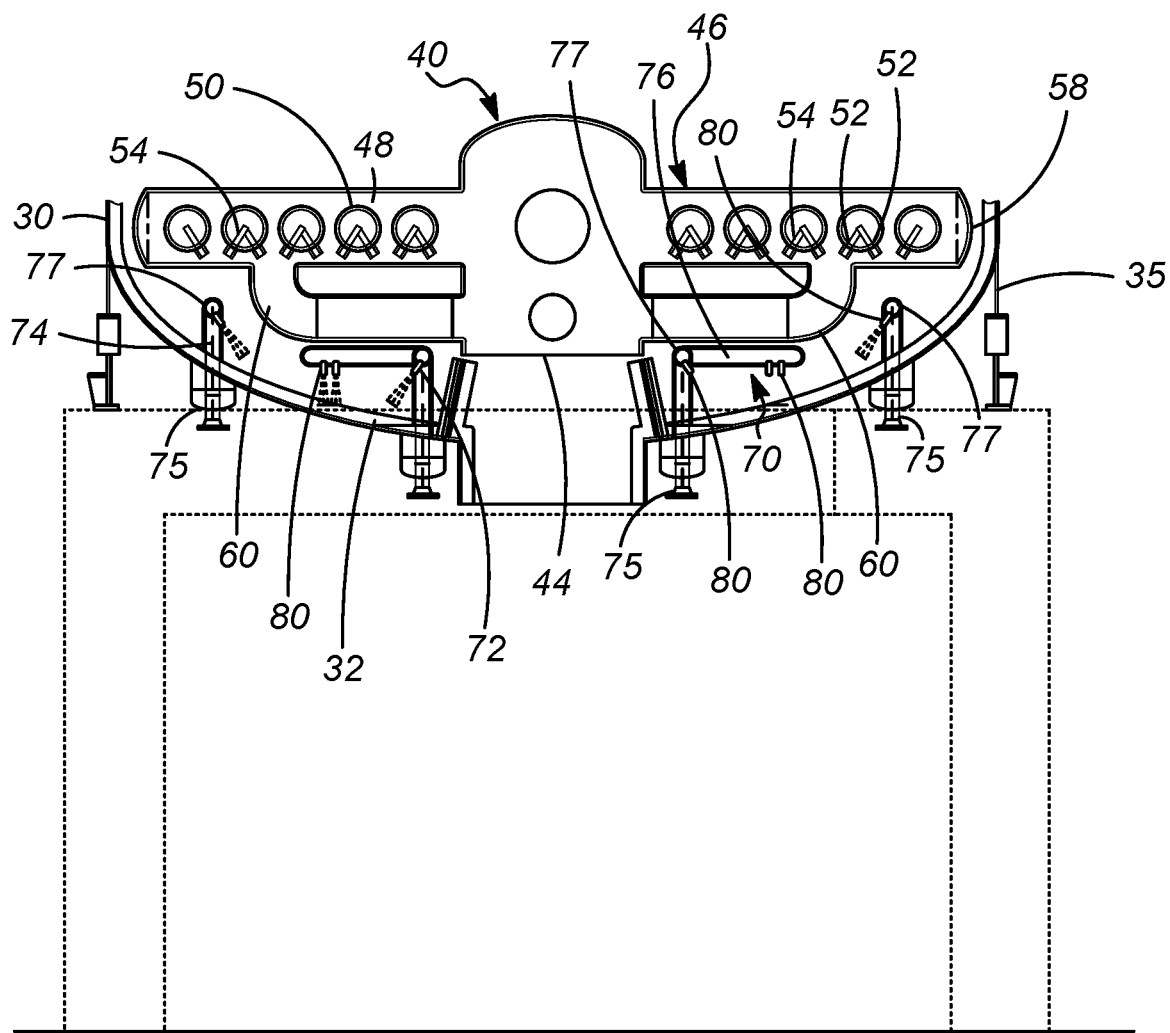
FIG. 3 is a side sectional view of the lower portion of the combustor of FIG. 2 taken along line 3-3 of FIG. 2 and in the direction indicated.

FIGS. 2-3 show an example arrangement for the fluffing air distributor 70, which arrangement is referred to herein as a wreath arrangement. The fluffing air distributor 70, which is generally symmetrical, includes a radially inner ring (inner ring) 72 and a radially outer ring (outer ring) 74 of piping. Rings may be continuous (e.g., made of a single pipe forming a circle or part of a circle) or discontinuous (e.g., made from plural pipes each forming arced portions of a circle). The inner ring 72 and the outer ring 74 are preferably made from stainless steel, though other materials can be used. Air passages 75 coupled to and in fluid communication with the inner ring 72 and the outer ring 74 are provided to supply air to the inner ring 72 and the outer ring 74 from any of various sources, examples of which are described below. As best viewed in FIG. 3, the outer ring 74 defines a plane that is disposed above a plane defined by the inner ring 72, providing rings at different levels or heights.

A plurality of headers or arms 76 (e.g., pipe) are arranged circumferentially about the inner ring 72 and coupled to the inner ring using, for example, piping "tees" or welded connections, or other suitable connections. The arms 76 project outwardly from the inner ring, providing branches for the fluffing air distributor 70.

The inner ring 72 and the outer ring 74 each include one or more air conduits 77 in fluid communication with the air passages 75 for distributing air to the inner ring and outer ring. Further, each of the inner ring 72, the outer ring 74, and the arms 76 have bores 78 formed on bottom and/or top surfaces. In the example fluffing air distributor 70, the inner ring 72 includes twenty-four (inner) bores 78, the arms 76 collectively include twenty-four (middle) bores, and the outer ring 74 includes 32 (outer) bores, or eighty total bores. Bores may be of various sizes (e.g., diameters).

Jets, such as nozzles 80, extend into and from each of the bores 78. Example nozzles 80 include nozzles having a diameter between 2.54 cm (1") and 7.62 cm (3").

The outlets of the nozzles 80 of the fluffing air distributor 70 are disposed below the air grid 46, and below the outlets of the nozzles 54 of the air distributor 40. For clarity, the nozzles 54 of the air distributor 40 may be referred to as first nozzles, and the nozzles 80 of the fluffing air distributor 70 may be referred to as second nozzles, though the nozzles may or may not be configured similarly. Both the inner ring 72 and the outer ring 74 are disposed below the header arms 48 and pipes 50 from which the (first) nozzles 80 extend, and below the lower tangent line 58, so that outlets of the (second) nozzles 80 extending from the inner ring 72 and the outer ring 74 are disposed below the lower tangent line.

For example, outlets of the (second) nozzles 80 extending from the inner ring 72 and the arms 76 can be disposed at a level below the lower tangent line 58 by a height distance (that is, distance from top to bottom for the regenerator 10 in the orientation shown in FIGS. 1 and 3) that is between 50% and 70% of the height distance between the lower tangent line and the bottom of the vessel 30. Similarly, outlets of the (second) nozzles 80 extending from the inner ring 72 (or from any arms extending from the outer ring, though none are provided in the fluffing air distributor 70) can be disposed at a level below the lower tangent line 58 by a height distance that is between 50% and 70% of the height distance between the lower tangent line and the bottom of the vessel 30. If only a single nozzle height is provided for the fluffing air distributor 70, outlets of the nozzles 80 preferably are disposed at a level below the lower tangent line 58 at a height distance that is between 50% and 70% of the height distance between the lower tangent line and the bottom of the vessel 30.

It will be appreciated that the wreath arrangement in the fluffing air distributor 70 of FIGS. 1-3 is merely an example arrangement, and other arrangements are possible. In another example fluffing air distributor (not shown), only a single ring with circumferentially arranged arms replaces the inner ring 72 and the outer ring 74. In yet another example fluffing air distributor (not shown), more than three or more rings, e.g., between three and ten rings, are provided. Multiple rings can be disposed at the same heights or at different heights, so that nozzles are positioned at the same height or at different heights. In some embodiments, multiple rings and associated nozzles 80 are disposed at different respective radii and heights between the air grid 46 and the bottom of the vessel 30. Non-circular shaped pipes and branches can be used in place of the inner ring 72, the outer ring 74, or additional rings, and the nozzles 80 can be disposed at various planar locations and levels. The nozzles 80 may be distributed evenly (e.g., in plan view) or unevenly on the fluffing air distributor 70, though it is preferred to distributor the nozzles more evenly to provide more even catalyst fluidization. It is also contemplated to plug one or more selected nozzles 80 to configure fluidization. The quantity, arrangement, and size of the nozzles 80 in the fluffing air distributor 70 can be selected and provided in any combination, though certain combinations may be more desirable to achieve a particular fluidization of stagnant catalyst.

Figure 4:
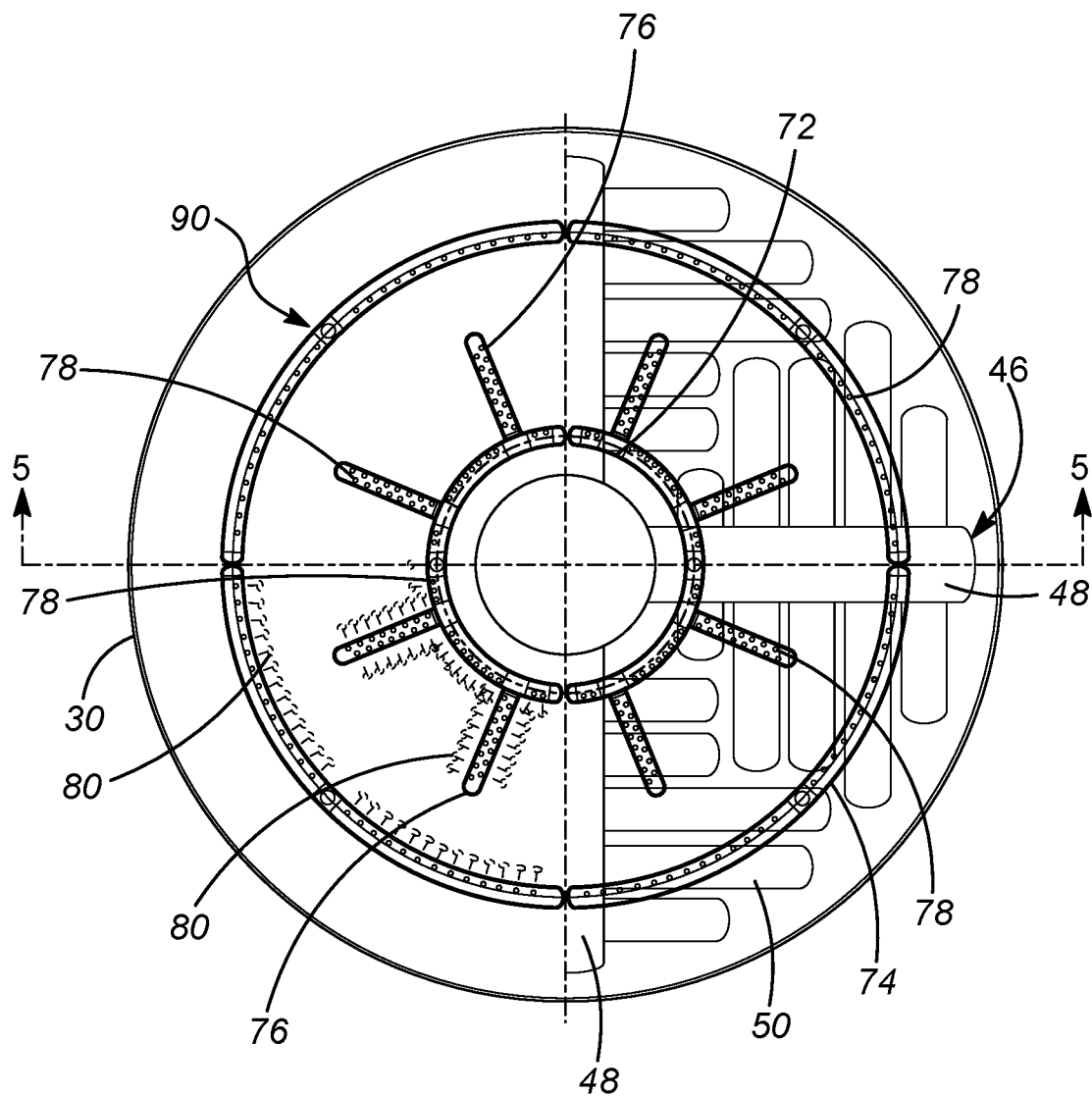
FIG. 4 is a bottom sectional view of a lower portion of a combustor similar to FIGS. 1-3, in which an additional example fluffing air distributor is shown.
Figure 5:
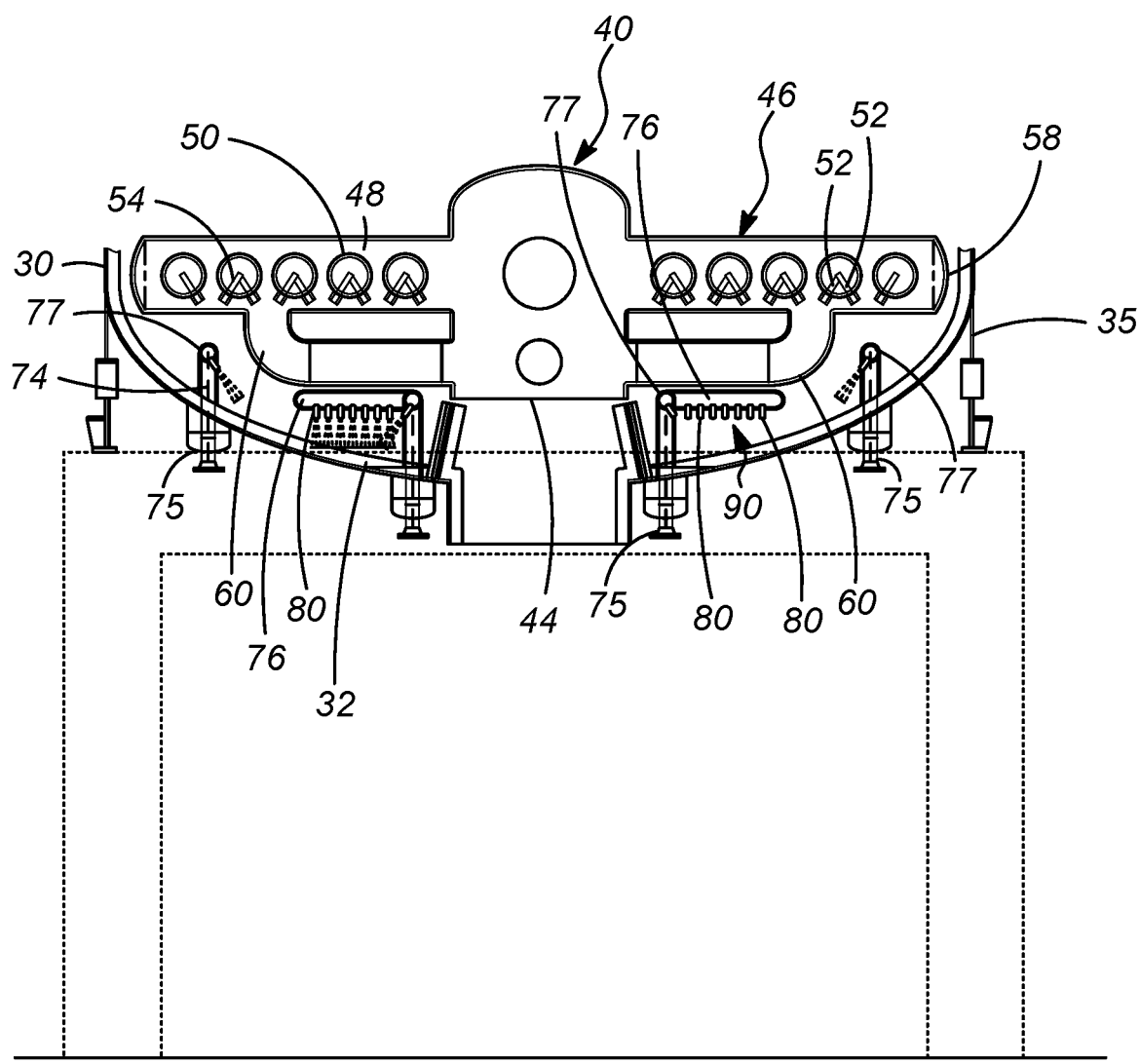
FIG. 5 is a side sectional view of the lower portion of the combustor of FIG. 4 taken along line 5-5 of FIG. 4 and in the direction indicated.

For instance, FIGS. 4-5 show another example fluffing air distributor 90. The fluffing air distributor 90 is generally similar to the fluffing air distributor 70, but includes fewer arms 76 disposed about the inner ring 72. Also, the fluffing air distributor 90 includes a greater number of bores 78 and associated nozzles 80 distributed along the inner ring 72, the outer ring 74, and the arms 76.

Air for the fluffing air distributor 70, 90, e.g., via the air passages 75, can be provided from various air sources, including by providing a dedicated connection to a separate air source, by providing a connection from an existing air source to divert air, or a combination of these. For example, air to the fluffing air distributor 70 can be provided by diverting a portion of the air feeding to the air supply 36 that is coupled to the air distributor 40, providing a common air source embodied in an air blower. This air introduction can be controlled using suitable controls such as a flow indicating controller 84 that operates a valve 86.

Figure 6:
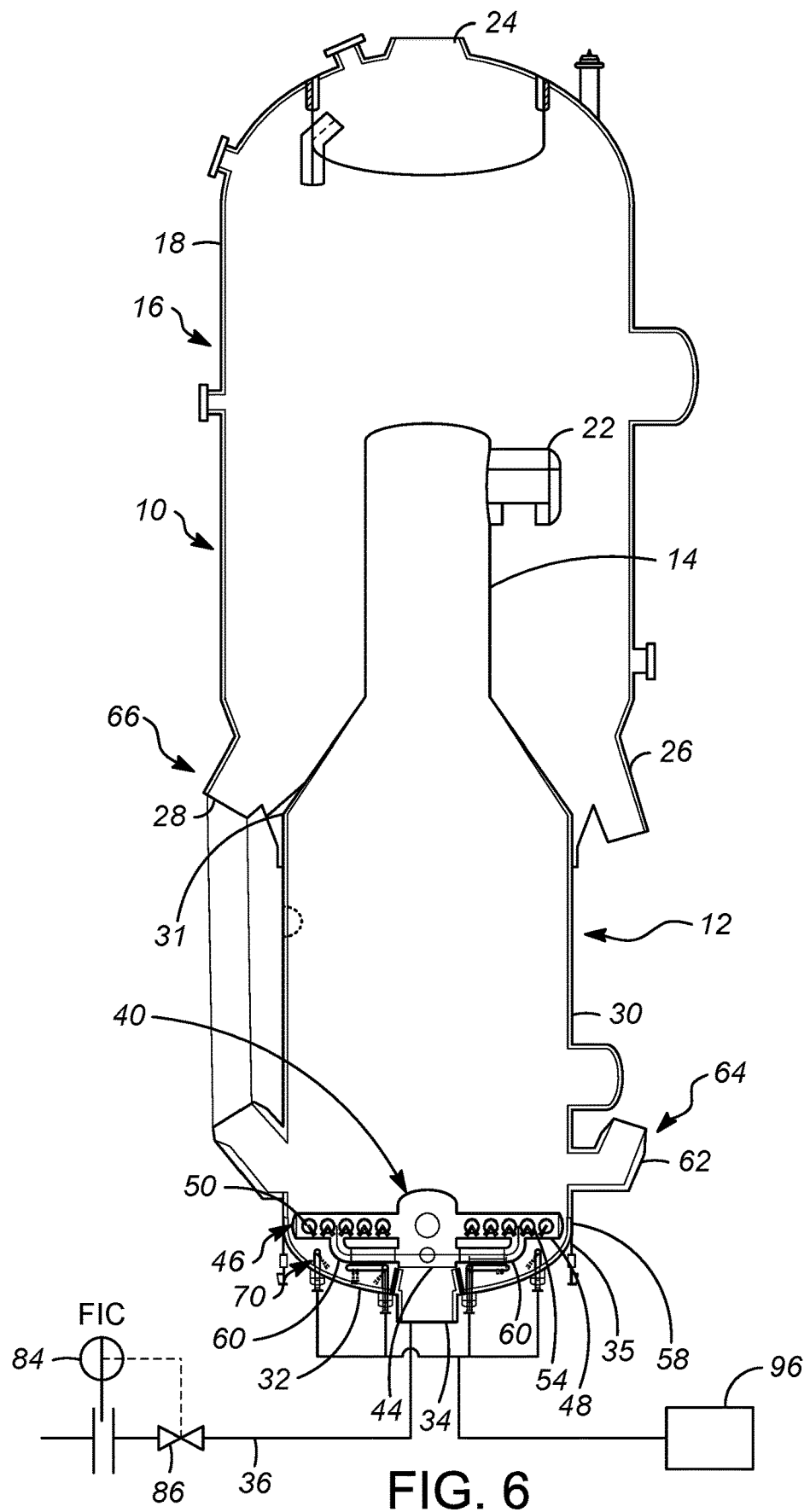
FIG. 6 is a sectional view of a combustor style regenerator for a fluidic catalytic cracking process similar to FIG. 1, in which an additional air source to the fluffing air distributor is shown.

Alternatively or additionally, as shown in FIG. 6, air to the fluffing air distributor 70, 90 can be provided by diverting a portion of the air feeding to a separate air source 96, e.g., a separate blower used for providing lance air to the catalyst cooler (not shown), a separate blower providing fluffing air to the upper regenerator 16, auxiliary blowers or compressors, utility (plant) air, or other sources. Air from such additional air sources 96 can be controlled using suitable controls, such as but not limited to valves operated by flow indicating controllers. Injecting air into the fluffing air distributor 70, 90 will not significantly affect energy usage if the air is provided from one of the existing air sources (e.g., air blowers/compressors) in the combustor style regenerator 10. Further, this air will contribute towards coke combustion, and no increase in $NO_x$ will occur in this location.

The fluffing air rate provided by the fluffing air distributor 70, 90 can be selected and configured based on the number of the nozzles 80, the size(s) of the nozzles 80, and/or the air pressure provided for the fluffing air distributor 70 from its source(s). For example, for smaller (or larger) diameter nozzles 80, larger (or smaller) numbers of nozzles or increased (or decreased) pressure may be employed for a particular fluffing air rate.

An example fluffing air rate for the fluffing air distributor 70, 90 can be expressed as a proportion, e.g., a percentage, of a base combustion air rate, that is, an air rate for the air distributor 40 for the combustion where the fluffing air distributor 70, 90 is not used. Example fluffing air rates for the fluffing air distributor 70, 90 can range from 0.5 wt % to 10 wt % of the base combustion air rate, and preferably from 1 wt % to 5 wt % of the base combustion air rate.

Increased fluffing air rates can require additional air to be made available to the fluffing air distributor 70, 90. It is thus desirable to reduce the fluffing air rate where possible while still fluidizing the stagnant catalyst. It has been found that arrangements of the fluffing air distributor 70, 90 that provide the nozzles 80 at multiple heights, such as by providing the inner ring 72 and the outer ring 74 at separate respective heights, can increase fluidization of the stagnant catalyst while limiting the required fluffing air rate for fluidization.

In an example combustion operation, air enters the regenerator 10 via the conduit 34 that is in fluid communication with the air distributor 40. The air distributor 40 divides the input air from the conduit to the plurality of nozzles 54, and the air is injected into the interior of the vessel. Spent catalyst (e.g., from a reaction zone (not shown)) is introduced into the vessel 30 via the spent catalyst standpipe 62 leading to the vessel. At the bottom of the combustor 12, the spent catalyst mixes with the air and (hot) recirculating catalyst from the catalyst recirculation standpipe 28 connected to the (upper) regenerator 18, fluidizing the spent catalyst. The air is used to burn the coke off the fluidized spent catalyst as the fluidized spent catalyst moves up the combustor 12 and the internal combustor riser 14.

As coke is being combusted from the spent catalyst, air (or other regeneration gas) is provided from an air source to a lower region of the vessel 30 below the air grid 46 (i.e., below the header arm 48 and the pipes 50) via the fluffing air distributor 70, 90. Providing this air can include introducing the air from an additional air source or sources 96, or by diverting air from existing air sources by connecting the fluffing air distributor to the existing air source(s). The provided air is distributed by the fluffing air distributor to the plurality of nozzles 80, outlets of which can be disposed at one or multiple levels and/or at one or multiple planar locations below the air grid 46. If the fluffing air distributor includes one or more rings for arranging the nozzles 80, outlets of the nozzles 80 can be disposed at multiple levels and/or at multiple radii. The air exiting the nozzles 80 can provide a fluffing air rate as described above. To reduce the fluffing air rate, the air can be directed to nozzles disposed along multiple rings, having multiple respective levels and radii.

With example methods using the example fluffing air distributor 70, 90, the stagnant catalyst bed below the air distributor 40 can become active, and thus can be reduced. The fluffing air distributor 70, 90 promotes stagnant catalyst circulation to increase the interaction of hot and cold solid catalyst, thus improving internal heat transfer. Enhanced heat transfer between the catalyst particles and the air (gas phase) occurs, resulting in a significant increase in the catalyst bed temperature, and promoting an increase of the vessel 30 temperature.

For example, by providing air to the fluffing air distributor 70, 90 as described above, the gravity-induced flow of the catalyst down the inner wall of the vessel 30 creates a low intensity circulation in the lower region of the vessel below the (upper) air distributor 40, particularly below the air grid 46 and near the bottom head 32. The temperature of the region is equalized (or more equalized) with the remainder of the combustor 12 due to the enhanced mixing of the catalyst. Particularly, the hot catalyst interacts with colder catalyst below the air grid 46, created by the effect of gas bubbles conveying cold catalyst in its wake above the air distributor 40, and hot catalyst backfilling the region below the air distributor. This in turn can increase the temperature at the bottom head 32, e.g., at the surface of the refractory, increasing the skin temperature of the vessel 30.

As another benefit, fluidizing the stagnant catalyst below the air grid 46 using the fluffing air distributor can make it easier to unload the stagnant catalyst in the bottom head 32 during shutdowns/turnarounds, which can be time consuming.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understating the embodiments of the present invention.

Specific Embodiments

While the following is described in conjunction with specific embodiments, it will be understood that this description is intended to illustrate and not limit the scope of the preceding description and the appended claims.

A first embodiment of the invention is a method for fluidizing a spent catalyst in a regenerator during a combustion process, the regenerator including a vessel and an air distributor, the air distributor including an air grid disposed at a bottom of the vessel and a plurality of first nozzles extending from the air grid, the method comprising introducing the spent catalyst into the vessel; providing air to the vessel via the plurality of first nozzles at a base combustion air rate; and providing additional air to the vessels via a plurality of second nozzles of a fluffing air distributor at a fluffing air rate that is between 0.5 wt % and 10 wt % of the base combustion air rate to fluidize the spent catalyst, the plurality of second nozzles having outlets that are disposed below the air grid and above a bottom head of the vessel. An embodiment of the invention is one, any or all of prior embodiments in this paragraph up through the first embodiment in this paragraph, wherein the fluffing air rate is between 1 wt % and 5 wt % of the base combustion air rate. An embodiment of the invention is one, any or all of prior embodiments in this paragraph up through the first embodiment in this paragraph, wherein the outlet of at least one of the plurality of second nozzles is disposed at a height distance from a lower tangent line of the vessel that is between 50% and 70% of the height distance between the lower tangent line and the bottom head of the vessel. An embodiment of the invention is one, any or all of prior embodiments in this paragraph up through the first embodiment in this paragraph, wherein the outlets of the plurality of second nozzles are disposed on at least two levels, each of the two levels being disposed at a different height distance from the air grid. An embodiment of the invention is one, any or all of prior embodiments in this paragraph up through the first embodiment in this paragraph, wherein the plurality of second nozzles are arranged in at least one ring. An embodiment of the invention is one, any or all of prior embodiments in this paragraph up through the first embodiment in this paragraph, wherein the plurality of second nozzles are arranged in a plurality of rings, each of the plurality of rings having a different radius. An embodiment of the invention is one, any or all of prior embodiments in this paragraph up through the first embodiment in this paragraph, wherein each of the plurality of rings is disposed at a different height distance from the air grid. An embodiment of the invention is one, any or all of prior embodiments in this paragraph up through the first embodiment in this paragraph, wherein the provided air and the provided additional air are from a common air source. An embodiment of the invention is one, any or all of prior embodiments in this paragraph up through the first embodiment in this paragraph, wherein the provided air is from an air source; and wherein the provided additional air is from an additional air source. An embodiment of the invention is one, any or all of prior embodiments in this paragraph up through the first embodiment in this paragraph, wherein the regenerator further includes a catalyst cooler fed by a blower or plant air header; and wherein the additional air source comprises the blower or plant air header. An embodiment of the invention is one, any or all of prior embodiments in this paragraph up through the first embodiment in this paragraph, wherein the regenerator further comprises an upper regenerator fed by a blower or plant air header; and wherein the additional air source comprises the blower or plant air header. An embodiment of the invention is one, any or all of prior embodiments in this paragraph up through the first embodiment in this paragraph, wherein the bottom head is covered by a refractory lining material.

A second embodiment of the invention is a method for fluidizing a spent catalyst in a regenerator during a combustion process, the regenerator including a vessel and an air distributor, the air distributor including an air grid disposed proximate to a lower tangent line of the vessel and a plurality of first nozzles extending from the air grid, the method comprising introducing the spent catalyst into the vessel; providing air to the vessel via the plurality of first nozzles at a base combustion air rate; and providing additional air to the vessels via a plurality of second nozzles of a fluffing air distributor to fluidize the spent catalyst, the plurality of second nozzles having outlets that are disposed below the air grid and above a bottom head of the vessel; wherein the outlets of the plurality of second nozzles are disposed on at least two levels, each of the two levels being disposed at a different height distance from the air grid. An embodiment of the invention is one, any or all of prior embodiments in this paragraph up through the second embodiment in this paragraph, wherein each of the at least two levels is disposed at a height distance from the air grid that is between 50% and 70% of the distance between the air grid and the bottom head of the vessel. An embodiment of the invention is one, any or all of prior embodiments in this paragraph up through the second embodiment in this paragraph, wherein the plurality of second nozzles are arranged in a plurality of rings, each of the plurality of rings having a different radius and being disposed at a different height distance from the air grid. An embodiment of the invention is one, any or all of prior embodiments in this paragraph up through the second embodiment in this paragraph, wherein the provided air and the provided additional air are from a common air source. An embodiment of the invention is one, any or all of prior embodiments in this paragraph up through the second embodiment in this paragraph, wherein the provided air and the provided additional air are from different air sources.

A third embodiment of the invention is an apparatus for regenerating a spent catalyst, the apparatus comprising a vessel for receiving the spent catalyst through a catalyst inlet and an air distributor disposed in the vessel, the air distributor comprising an air grid below the catalyst inlet and a plurality of first nozzles extending from the air grid into the vessel; an air source coupled to the air distributor; and a fluffing air distributor disposed in the vessel for fluidizing the spent catalyst, the fluffing air distributor comprising a plurality of second nozzles having outlets disposed below the air grid and above a bottom head of the vessel; wherein the plurality of second nozzles are disposed on at least two levels, each of the two levels being disposed at a different height distance from the air grid. An embodiment of the invention is one, any or all of prior embodiments in this paragraph up through the third embodiment in this paragraph, wherein the plurality of second nozzles are arranged in a plurality of rings, each of the plurality of rings having a different radius and being disposed at a different height distance from the air grid. An embodiment of the invention is one, any or all of prior embodiments in this paragraph up through the third embodiment in this paragraph, further comprising an additional air source coupled to the fluffing air distributor.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A method for fluidizing a spent catalyst in a regenerator during a combustion process, the regenerator including a vessel and an air distributor, the air distributor including an air grid disposed at a bottom of the vessel and a plurality of first nozzles extending from the air grid, the method comprising:
    introducing the spent catalyst into the vessel;
    providing air to the vessel via the plurality of first nozzles at a base combustion air rate; and
    providing additional air to the vessels via a plurality of second nozzles of a fluffing air distributor at a fluffing air rate that is between 0.5 wt % and 10 wt % of the base combustion air rate to fluidize the spent catalyst, the plurality of second nozzles having outlets that are disposed below the air grid and above a bottom head of the vessel.

2. The method of claim 1, wherein the fluffing air rate is between 1 wt % and 5 wt % of the base combustion air rate.

3. The method of claim 1, wherein the outlet of at least one of the plurality of second nozzles is disposed at a height distance from a lower tangent line of the vessel that is between 50% and 70% of the height distance between the lower tangent line and the bottom head of the vessel.

4. The method of claim 1, wherein the outlets of the plurality of second nozzles are disposed on at least two levels, each of the two levels being disposed at a different height distance from the air grid.

5. The method of claim 1, wherein said plurality of second nozzles are arranged in at least one ring.

6. The method of claim 1, wherein said plurality of second nozzles are arranged in a plurality of rings, each of said plurality of rings having a different radius.

7. The method of claim 6, wherein each of said plurality of rings is disposed at a different height distance from the air grid.

8. The method of claim 1, wherein said provided air and said provided additional air are from a common air source.

9. The method of claim 1, wherein said provided air is from an air source and wherein said provided additional air is from an additional air source.

10. The method of claim 9, wherein the regenerator further includes a catalyst cooler fed by a blower or plant air header; and wherein the additional air source comprises the blower or plant air header.

11. The method of claim 9, wherein the regenerator further comprises an upper regenerator fed by a blower or plant air header; and wherein the additional air source comprises the blower or plant air header.

12. The method of claim 1, wherein the bottom head is covered by a refractory lining material.

13. A method for fluidizing a spent catalyst in a regenerator during a combustion process, the regenerator including a vessel and an air distributor, the air distributor including an air grid disposed proximate to a lower tangent line of the vessel and a plurality of first nozzles extending from the air grid, the method comprising:
    introducing the spent catalyst into the vessel;
    providing air to the vessel via the plurality of first nozzles at a base combustion air rate; and
    providing additional air to the vessels via a plurality of second nozzles of a fluffing air distributor to fluidize the spent catalyst, the plurality of second nozzles having outlets that are disposed below the air grid and above a bottom head of the vessel;

wherein the outlets of the plurality of second nozzles are disposed on at least two levels, each of the two levels being disposed at a different height distance from the air grid.

14. The method of claim 13, wherein each of the at least two levels is disposed at a height distance from the air grid that is between 50% and 70% of the distance between the air grid and the bottom head of the vessel.

15. The method of claim 13, wherein the plurality of second nozzles are arranged in a plurality of rings, each of said plurality of rings having a different radius and being disposed at a different height distance from the air grid.

16. The method of claim 13, wherein said provided air and said provided additional air are from a common air source.

17. The method of claim 13, wherein said provided air and said provided additional air are from different air sources.

* * * * *